United States Patent Office 3,421,104

Patented Jan. 7, 1969

3,421,104

FREQUENCY CONTROL SYSTEM WITH SEARCH SWEEP

Lucien Babany, Blanc-Mesnil, and Didier Bernadet, Courcelles-S-Viosnes, France, assignors to CIT-Compagnie Industrielle des Telecommunications, Paris, France, a corporation of France Filed Aug. 2, 1966, Ser. No. 569,687
Claims priority, application France, Aug. 5, 1965, 27,398
U.S. Cl. 331—4 6 Claims
Int. Cl. H03b *3/04;* H03b *5/00*

ABSTRACT OF THE DISCLOSURE

A frequency control system including a main variable frequency oscillator and a reference oscillator connected to a phase discriminator, a sweep oscillator connected to the main oscillator for sweeping the output frequency thereof, a D-C amplifier connected to the output of said phase discriminator for providing a D-C control signal to the sweep oscillator to stop operation thereof and to said main oscillator to maintain synchronism thereof.

The invention relates to a simple circuit by which a variable frequency oscillator may be caused to pass from a first kind of frequency scanning operation to a second state of locking at a synchronized frequency, thereby terminating the scanning operation. The present invention is applicable to a very well-known category of oscillators, capable of covering a large frequency range by applying a variable polarization voltage to a variable capacity diode (or varactor), and to be locked by means of a phase discriminator at a frequency supplied by an external source, whose value ranges within the limits of the said variation range.

Solutions to this problem are already known as evidenced in particular by French Patent No. 1,288,134 applied for on Feb. 1, 1961, and entitled, "Electronic Scanning Controlled Frequency Synthesizer." In this patent, a complex circuit, comprising filtering means, logical elements, and an analogous storage device, ensures transition from the scanning state to the synchronized state.

The present invention offers an easily practicable solution for a device enabling transition from the scanning to the synchronized state, being at least equally safe, the reliability of a simple circuit being nearly always greater than that of a circuit composed of numerous elements.

The present invention is based on the use of the direct current component which appears at the output of a phase discriminator energized by a reference frequency $F_0$ and by a slowly variable frequency F during a frequency scanning cycle of a variable varactor oscillator, when F is sufficiently close to $F_0$. It is known that, under these conditions a direct current voltage component modulated at an increasingly slower rate appears at the output of the phase discriminator.

The invention makes use of this direct current component, as soon as it has reached a sufficiently high level, for the purpose of modifying the operation of a main transistor, which, at the beginning of the scanning, is initially saturated, and then, under the effect of the said direct current component, passes to the continuous voltage linear amplifier state, stopping the frequency scanning and ensuring the control of frequency F at frequency $F_0$.

According to the invention, in a device comprising a variable frequency oscillator, subjected to a scanning operation in a frequency range $F_1<F<F_2$, by application of a saw-tooth voltage supplied by an auxiliary generator to a first electrode of a varactor, there is provided another oscillator with a fixed frequency $F_0$ and a phase discriminator energized by the two frequencies F and $F_0$, the end of the scanning operation and initiation of a locking of frequency F on frequency $F_0$ being obtained by applying a D-C voltage coming from the phase discriminator to a transistor connected between the phase discriminator and the saw-tooth voltage generator; the said D-C voltage being applied on the one hand to stopping means of the said auxiliary generator and on the other hand to a second control electrode of the varactor.

This feature as well as others will be better understood from the detailed description which will be given hereunder with reference to the attached drawing, in which:

FIGURES 1*a* and 1*b* explain how a continuous polarization frequency of the varactor is generated in the presence of two different frequencies applied to a phase discriminator.

Figure 1A:
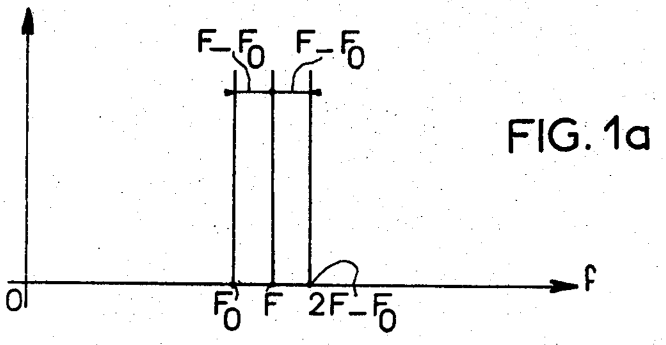

In FIGURE 1*a* a frequency F is shown on a frequency scale, combined in two different ways by reason of the non-linearity of the rectifiers which supply a phase discriminator with a frequency equal to the difference between two frequencies, F and $F_0$, that is, $F-(F-F_0)$ and $F+(F-F_0)$. The first term gives $F_0$ and the second term $2F-F_0$. It is thus understood that, by this mechanism, if two closely related frequencies F and $F_0$ are applied to a phase discriminator, a frequency $F_0$ is created within the phase discriminator, which, when combined with the applied frequency F, produces at its output a modulated D-C voltage component with an increasingly slower rhythm, which causes the locking of F at $F_0$.

Figures 1B, 3:
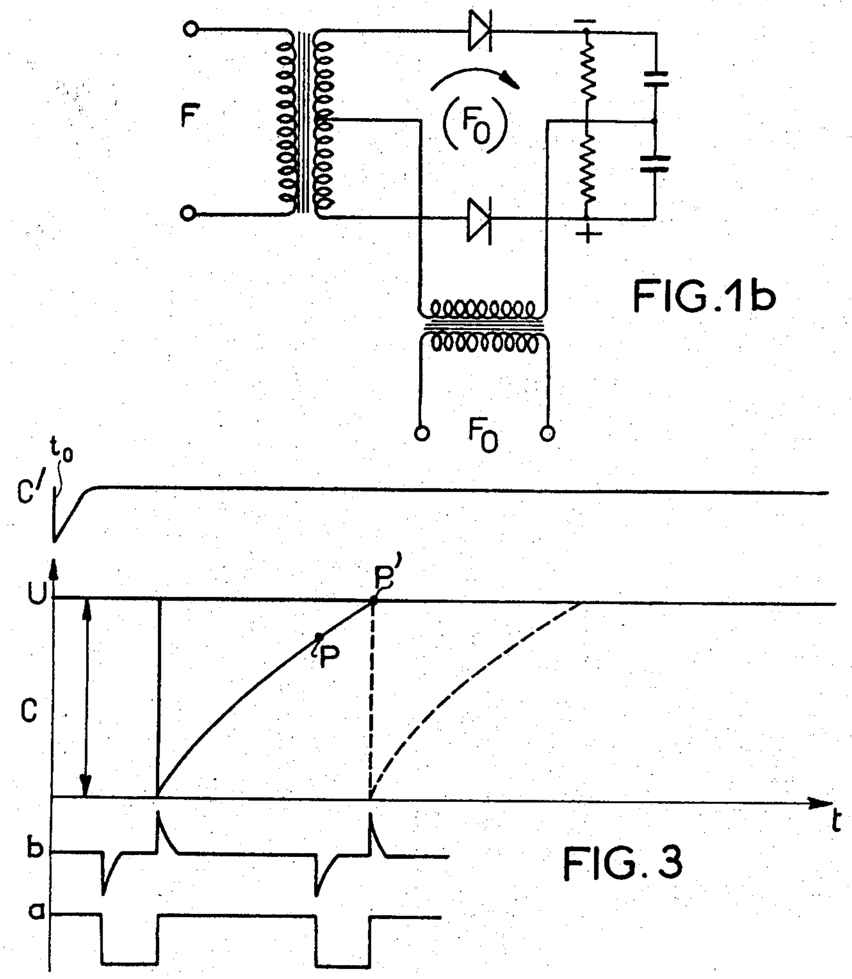
FIGURE 3 shows voltage variation curves which help the comprehension of the operation of the invention.

FIGURE 1*b* is a diagram of a phase discriminator, showing that, for two frequencies F and $F_0$ applied from outside, a component $F_0$ may exist in the circuit which combines with the signal $F_0$ to produce a D-C voltage component at the output.

Figure 2:
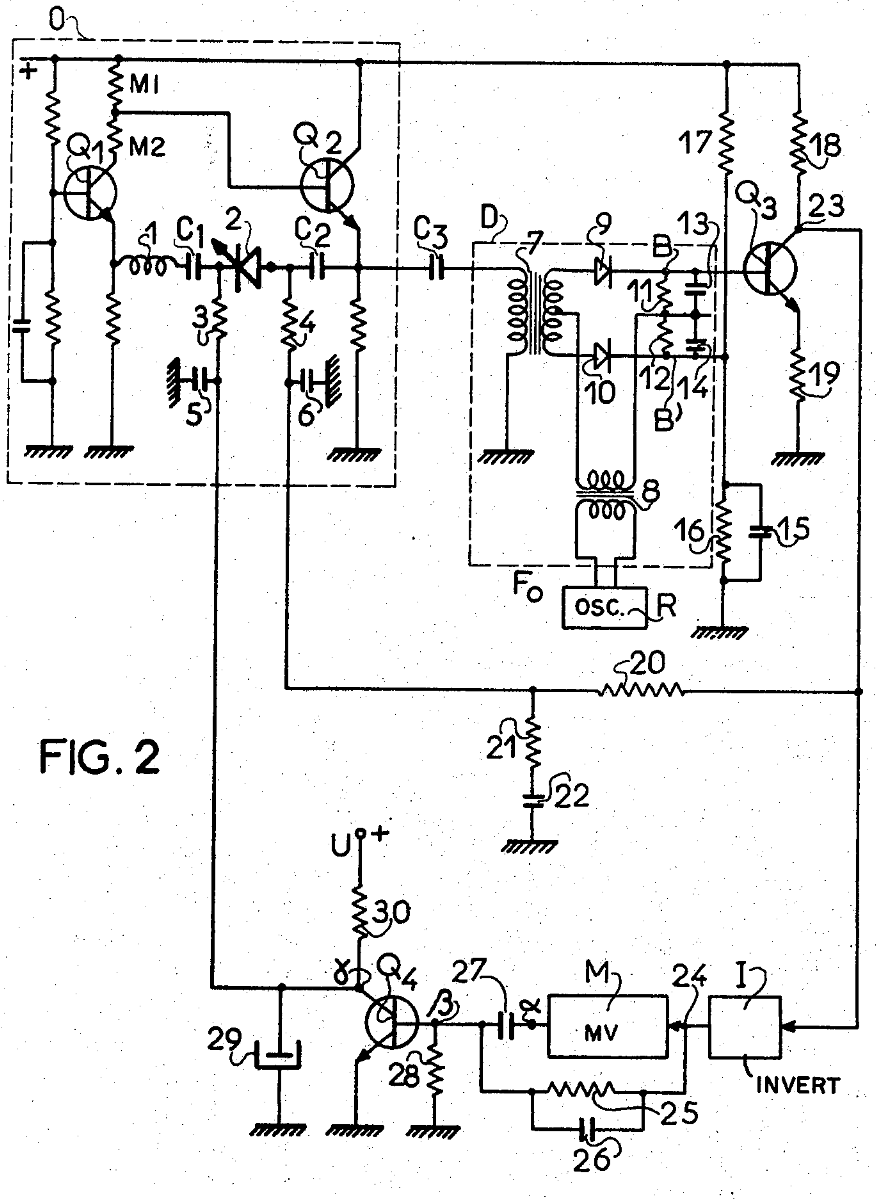
FIGURE 2 is a general diagram showing one embodiment of the invention.

In FIGURE 2 an oscillator O providing a variable frequency F, comprises two transistors $Q_1$ and $Q_2$, the collector of transistor $Q_1$ being connected to the base of transistor $Q_2$ through a voltage divider made up of resistors $M_1$ and $M_2$, the emitter of transistor $Q_1$ being connected through an inductance 1 in series with a capacitor $C_1$ to a first electrode of a variable capacity diode 2, the second electrode of which is connected to the emitter of transistor $Q_2$ through a capacitor $C_2$.

The emitter of transistor $Q_2$ is connected through a coupling capacitor $C_3$ to an input terminal of a phase discriminator D, the said input terminal being connected to one terminal of the primary winding of a first transformer 7, the other terminal of the primary winding being grounded and the secondary winding of said transformer 7 having its mid-point connected to one terminal of the primary winding of a second transformer 8 which has both terminals of its secondary winding connected to the two terminals of an oscillator R providing a reference frequency $F_0$.

The two terminals of the secondary winding of the transformer 7 are connected respectively via two diodes 9 and 10 to two terminals B and B′ of two series resistors 11 and 12, two series capacitors 13 and 14 connecting the two terminals B and B′, respectively, thereby forming the output terminals of the phase discriminator. The second terminal of the primary winding of the said second transformer 8 is connected to the common terminal of the two capacitors 13 and 14.

One of the output terminals B of the phase discriminator D is connected at the base of an amplifying transistor $Q_3$ the collector 23 of which is energized by means of a resistor 18 connected to a voltage supply. The other output terminal B′ of the phase discriminator D is connected to the common terminal of two resistors 16 and 17, forming a voltage divider connected to the resistor 18 to maintain the balancing point of the phase discriminator at a positive voltage for prepolarization of the transistor $Q_3$ in order to render it saturated in the absence of D-C voltage between points B and B′. A capacitor 15 serves to decouple the resistor 16. The emitter of the transistor $Q_3$ is grounded via a resistor 19, whereas its collector is connected on the one hand to the input 24 of a saw-tooth voltage generator M, which may take the form of a multivibrator, via a stop-start control for the multivibrator, for example a transistor inverter I, and on the other hand to the said second electrode of the variable capacitance diode 2 by way of a high time constant filter, comprising two resistors 20 and 21 and a capacitor 22, in series with a resistor 4 decoupled by a capacitor 6. The saw-tooth voltage generator connected to the said inverter I comprises a multivibrator M in series with a differentiating network comprising a capacitor 27 and a resistor 28, the common terminal of which is the output $\beta$ of the saw-tooth voltage generator.

The said output $\beta$ is connected to the base of the transistor $Q_4$ forming an integrator with a large capacitor 29 charged by a resistor 30. The connection $\gamma$, common to the collector of transistor $Q_4$, resistor 30 and one electrode of capacitor 29, is connected via a resistor 3 decoupled by a capacitor 5, to the said first electrode of the variable capacity diode 2.

The above-described arrangement operates as follows:

At the beginning of a scanning cycle, since frequencies F and $F_0$ are too far apart, there is still a low amplitude alternating voltage between points B and B′ having no D-C component, which voltage has no influence upon collector 23 of transistor $Q_3$. Transistor $Q_3$ is thus saturated as a result of the potential at point B′ by the prepolarization potential applied via the voltage divider 16, 17 which maintains the balancing of the phase discriminator at a positive voltage. There will thus appear at the anode of the variable capacity diode 2 a weak constant positive voltage, for example +0.2 v. The capacitor 29 is initially charged. Point $\gamma$ is live (for example, at +12 v.). The transistor $Q_4$ is also initially not conductive, its internal impedance being very high. The collector 23 of transistor $Q_3$ has a voltage close to zero and provides a zero signal to the transistor inverter I, which in turn transmits positive signals to the multivibrator M, which then oscillates. The multivibrator M emits a square wave, from which two pulses result by differentiation, one of which is a positive pulse rendering the transistor $Q_4$ conductive; the capacitor 29 is thus sharply discharged, for example to +1 v., and slowly recharged by a saw-tooth voltage to +12 v. when the transistor $Q_4$ has returned to the non-conductive condition, as may be seen in FIGURE 3.

FIGURE 3 shows at *a* the voltage at point $\alpha$ of FIGURE 2 as a function of time, at *b* the voltage at point $\beta$, and at *c* the voltage at point $\gamma$ as a function of time.

From the first square wave emitted by the multivibrator M, at point $\alpha$, a first negative pulse results at $\beta$ and then a second positive pulse. The latter has the effect of rendering the transistor $Q_4$ (FIGURE 2) conductive, whereupon the capacitor 29 is sharply discharged, and slowly recharged via the resistor 30. At point $\gamma$ a saw-tooth voltage arises, which is shown at *c* in FIGURE 3. The result thereof is application of a positive voltage to the cathode of diode 2, which voltage varies, for example, from +1 v. to +12 v. This causes a frequency F of the oscillator O to rise to the neighborhood of the frequency $F_0$ of the reference oscillator R.

When synchronization takes place at point P shown in FIGURE 3, the phase discriminator begins to furnish a negative D-C voltage between B′ and B and, as a result, the transistor $Q_3$ is no longer saturated; the negative voltage at its base is corrected, which causes it to pass to the continuous voltage linear amplifier state. The voltage output from transistor $Q_3$ is applied, via the filter 20, 21, 22 to one side of the varactor 2. The voltage of point $\gamma$ continues voltage increase as capacitor 29 charges to maximum voltage (branch of curve PP′), but the frequency shift of oscillator O is stopped at point P by voltage compensation of the voltage between the two electrodes of the varactor supplied by transistor $Q_3$. The multivibrator M being stopped by an inhibiting voltage supplied by the inverter I, there is no further saw-tooth output therefrom and consequently capacitor 29 remains charged to the maximum value. Under these conditions the phase discriminator supplied a voltage of 12-$V_0$ volts to the anode of the diode 2 and the capacitor supplies a voltage of 12 volts to the cathode thereof providing a net reverse bias on the diode of $V_0$ volts.

The scanning process is relatively slow. The saw-tooth lasts about three seconds; however, extra time must also be allowed before the saw-tooth output is started.

If, subsequent to synchronization, the synchronism happens to be lost by a slight deviation, it is useful to possess means enabling a limited amplitude scanning to be rapidly effected, scanning sufficiently wide to compensate for a slight deviation.

To this end, the multivibrator M is shunted by a resistor-capacitor network 25, 26 between point 24 and point $\beta$ whose operation is as follows: when synchronization is lost, the transistor $Q_3$ again becomes saturated, the potential of its collector falls once more to a value close to zero. A positive state at point 24 develops at the output of inverter I. At the output end of the differentiating network 25–26, an instantaneous low amplitude pulse is thus emitted which partially discharges the capacitor 29. The result of this is a generation of saw-tooth wave of low amplitude, shown at *c* in FIGURE 3. While the principal saw-tooth has an amplitude of 20 v., for example, the wave *c′* will only have am amplitude of 2 v. This limited scanning is generally sufficient to readjust synchronism.

The length of the readjusting process is thus reduced from 4 or 5 seconds to a few milliseconds.

What we claim is:

1. A frequency controlled oscillator system comprising a reference frequency oscillator providing a stable frequency output signal,
   - a variable frequency oscillator capable of generating output signals in a range of frequencies including a variable capacitance diode for adjusting the frequency of the output signals within the range of frequencies,
   - a phase discriminator having a first input connected to the output of said reference frequency oscillator and a second input connected to the output of said variable frequency oscillator,
   - sweep oscillator means connected to one side of said variable capacitance diode for selectively generating a scanning output voltage, and
   - D-C voltage amplifier means connected to the output of said phase discriminator for generating a D-C control signal only in response to receipt of a D-C signal from said phase discriminator, one output of said amplifier means being connected to the other side of said variable capacitance diode,
   - said sweep oscillator means including sweep oscillator control means responsive to said D–C control signal from said amplifier means for preventing generation of said scanning output voltage.

2. A system as defined in claim 1 wherein said amplifier means comprises a transistor amplifier and a voltage divider for presaturating said amplifier, one output terminal from said phase discriminator being connected to one terminal of said voltage divider and a second output terminal from said phase discriminator being connected to the input of said amplifier, such that said amplifier provides a substantially zero output in absence of a D-C signal output from said phase discriminator.

3. A system as defined in claim 1 wherein said sweep oscillator means comprises a triggered multivibrator in series with a differentiating network and a transistor switch responsive to said differentiating network for selectively discharging a capacitor connected thereto, said capacitor being also connected to a source of charging voltage and said one side of said variable capacitance diode.

4. A system as defined in claim 3 wherein said sweep oscillator control means comprises an inverter circuit connected to the input of said multivibrator for producing a positive trigger signal in response to a substantially zero input signal and a zero level signal in response to a positive D-C signal.

5. A system as defined in claim 3 further including a derivation cell having a time constant of a few milliseconds comprising a parallel resistor-capacitor network connected between the input of said multivibrator and the output of said differentiating network for transmitting a low amplitude control voltage directly to said one side of said variable capacitance diode so as to correct for slight deviation of the frequency of said variable frequency oscillator from synchronism.

6. A system as defined in claim 1 further including a filter arrangement having a time constant of a few seconds connected between the output of said D-C voltage amplifier means and said other side of said variable capacitance diode.

References Cited

UNITED STATES PATENTS 2,756,337 7/1956 Shanahan ---------- 331—4 X

FOREIGN PATENTS 928,085 6/1963 Great Britain.

ROY LAKE, *Primary Examiner.*

S. H. GRIMM, *Assistant Examiner.*

U.S. Cl. X.R.

331—8, 26, 36, 117, 177